(No Model.)
E. A. WOOD & I. T. BABBITT.
COMBINED ICE CREAM FREEZER AND CHURN.
No. 302,879. Patented July 29, 1884.
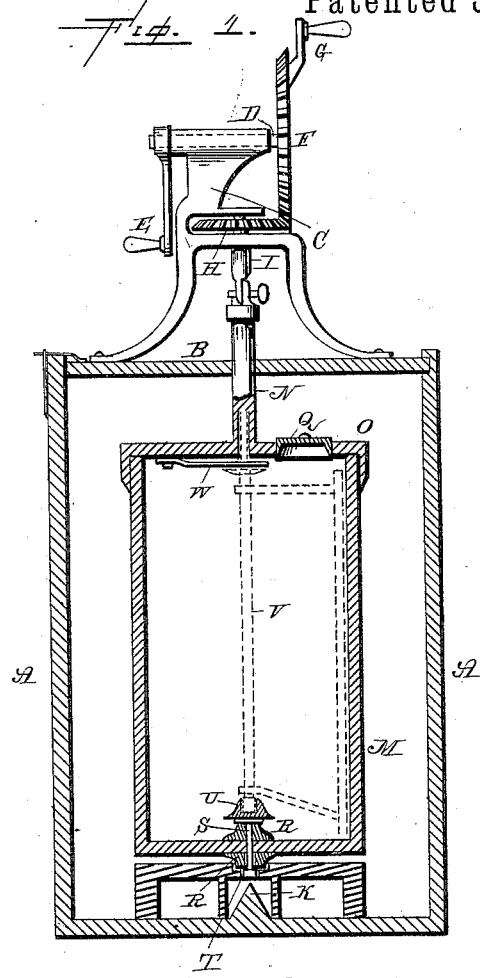
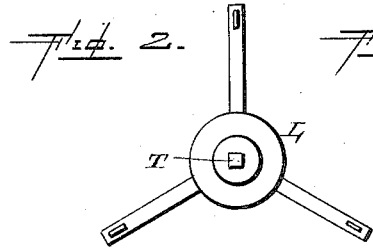 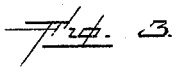 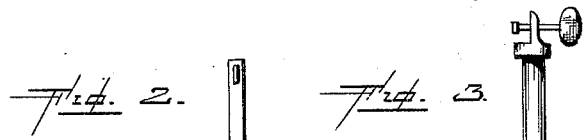
Witnesses.
Louis F. Gardner
J. W. Gardner
Inventors.
E. A. Wood,
I. T. Babbitt,
per
F. A. Lehmann, atty

UNITED STATES PATENT OFFICE.

EDWIN A. WOOD AND IRA T. BABBITT, OF ST. AUGUSTINE, ILLINOIS.

COMBINED ICE-CREAM FREEZER AND CHURN.

SPECIFICATION forming part of Letters Patent No. 302,879, dated July 29, 1884.

Application filed March 20, 1884. (No model.)

*To all whom it may concern:*

Be it known that we, EDWIN A. WOOD and I. T. BABBITT, of St. Augustine, in the county of Knox and State of Illinois, have invented certain new and useful Improvements in a Combined Ice-Cream Freezer and Churn; and we do hereby declare the following to be a full, clear, and exact description of the invention, such as will enable others skilled in the art to which it pertains to make and use it, reference being had to accompanying drawings, which form part of this specification.

Our invention relates to an improvement in a combined ice-cream freezer and churn; and it consists, first, in the combination of a box which forms the churn proper, a suitable spider which is placed therein, a square-headed rod which is held stationary by the spider and which passes up into the ice-cream freezer, a revolving freezer, and the stationary dasher placed therein; second, in the combination of the revolving freezer, the mechanism for operating it with the stationary dasher D, the pivotal rod, a spring which is placed inside of the freezer for pressing the collar on the rod down so as to form a tight joint; third, in the arrangement and combination of parts, which will be more fully described hereinafter.

The object of our invention is to make the dasher of the churn removable and to substitute therefor a revolving ice-cream freezer, which is made to revolve by the same mechanism which operates the churn-dasher.

Figure 1 is a vertical section showing the ice-cream freezer in position. Fig. 2 is a plan view of the spider. Fig. 3 is a detached view of the dasher.

A represents a square box, which is provided with a lid, B, upon the top of which part B is placed the metallic bearing C, of any suitable construction. In the top of the bearing is journaled the shaft D, having the handle E at one end and the wheel F at the other, which wheel is also provided with a handle, G. This wheel F meshes with the pinion H, which is secured to the upper end of the shaft I and serves to operate both the churn-dasher J and the ice-cream freezer. When the churn alone is to be used, the dasher J is placed in the box A, so that its lower end rests upon the pivotal point K and the upper end of its shank or spindle is fastened in any suitable manner to the lower end of the shaft I.

When the churn is to be converted into an ice-cream freezer, the dasher J is removed so as to leave the bottom A entirely clear, and then the spider L is placed in its bottom, the can or freezer M is placed upon its top, and the stem N, which projects up from the center of its cover O, is braced in position by means of a cross-piece, P, which is placed in the top of the box A, and then the stem N is connected to the lower end of the shaft I. The freezer M consists of a circular vessel, enough smaller in diameter than the box A to allow the ice and salt to be packed in the box A around the outside of the freezer in the usual manner. This freezer is provided with a cover, O, which has a small opening made through it, and this opening is provided with a cover, Q. By moving the cover Q the contents of the freezer can be inspected at any time without having to remove the cover O. Riveted to the bottom of the freezer, both inside and out, is a suitable collar, R, through the center of which is made an opening for the passage of the rod S. In the top of the spider L is made a circular recess, in which the lower end of the collar R rests, and in the center of this circular recess is made a square hole or opening, T, in which the lower square end of the rod S is made to catch for the purpose of preventing the rod from revolving with the freezer M. Suitable washers or packing of any kind may be used in connection with the rod S for the purpose of forming a tight joint where the rod passes through the bottom of the freezer. Upon the top of the rod S is formed a socket, U, in which the lower end of the stationary dasher is made to catch. The upper end of this dasher V passes through the spring W, which is secured to the under side of the cover O, and which spring serves to press the dasher down against the socket U and thus assists in forming a tight joint upon the collar R. The upper end of the stem of the dasher V catches in a socket made in the lower end of the stem N, which assists in holding the dasher in an upright position. As this dasher V is thus held from moving, when the power is applied to the driving mechanism the freezer M revolves freely around the dasher, but without the dasher having any movement whatever.

Having thus described our invention, we claim—

1. The combination of the freezer M, the spider, the rod S, which is held stationary by the spider, and which is provided with a socket at its upper end, with a dasher, V, and a mechanism for revolving the freezer while the dasher is held stationary, substantially as described.

2. The combination of the revolving freezer, the spring W, the dasher V, and a means for holding the dasher in position while the freezer is made to revolve by the operating mechanism, substantially as set forth.

3. The combination of the spider L, the freezer M, the collars R, rod S, having its lower end made angular and held in position by means of the spider, and its upper end provided with a socket, with a dasher, V, spring W, and a mechanism for causing the freezer to revolve while the dasher remains stationary, substantially as specified.

In testimony whereof we affix our signatures in presence of two witnesses.

EDWIN A. WOOD.
IRA T. BABBITT.

Witnesses:
CHARLES B. EDMONSON,
JACOB H. COOPER.